(12) United States Patent
Teraoka

(10) Patent No.: US 7,354,374 B2
(45) Date of Patent: Apr. 8, 2008

(54) DIFFERENTIAL UNIT

(75) Inventor: Masao Teraoka, Tochigi (JP)

(73) Assignee: Tochigi Fuji Sangyo Kabushiki Kaisha, Tochigi-shi (JP)

( * ) Notice: Subject to any disclaimer, the term of this patent is extended or adjusted under 35 U.S.C. 154(b) by 164 days.

(21) Appl. No.: 11/221,155

(22) Filed: Sep. 6, 2005

(65) Prior Publication Data

US 2006/0052207 A1 Mar. 9, 2006

(30) Foreign Application Priority Data

Sep. 6, 2004 (JP) .............................. 2004-258447

(51) Int. Cl.
*F16H 48/20* (2006.01)
(52) U.S. Cl. .................................... 475/231
(58) Field of Classification Search ............... 192/48.8, 192/48.9, 48.91, 49, 35, 69.82; 475/231
See application file for complete search history.

(56) References Cited

U.S. PATENT DOCUMENTS

| | | | | |
|---|---|---|---|---|
| 5,172,787 A * | 12/1992 | Kobayashi | ................. | 180/197 |
| 5,366,421 A * | 11/1994 | Hirota | ......................... | 475/231 |
| 6,478,708 B2 * | 11/2002 | Krisher | ....................... | 475/150 |
| 6,561,939 B1 * | 5/2003 | Knapke | ....................... | 475/150 |
| 6,835,155 B2 * | 12/2004 | Busch et al. | ................. | 475/231 |
| 2003/0054913 A1 * | 3/2003 | Sayama | ...................... | 475/203 |
| 2004/0248692 A1 * | 12/2004 | Bryson et al. | .............. | 475/231 |
| 2006/0073931 A1 | 4/2006 | Teraoka | | |
| 2006/0247087 A1 * | 11/2006 | Pontanari et al. | .......... | 475/231 |
| 2006/0276298 A1 * | 12/2006 | Rodgers et al. | ............. | 475/231 |

FOREIGN PATENT DOCUMENTS

| | | |
|---|---|---|
| JP | 2000-240685 | 9/2000 |
| JP | 2003-158862 | 5/2003 |
| JP | 2003-232432 | 8/2003 |

* cited by examiner

*Primary Examiner*—Ha D. Ho
(74) *Attorney, Agent, or Firm*—Jordan and Hamburg LLP

(57) ABSTRACT

A differential unit which can be arranged in compact as a whole, while a differential limit and a differential lock are appropriately executed. The differential unit is provided with a differential mechanism transmitting from a differential case (45) to a pair of axle shafts a rotational force while allowing a differential rotation, and is provided with a differential limiting mechanism (57) which can limit the differential rotation, and a differential lock mechanism (59) which can lock up the differential rotation. The differential limiting mechanism (57) is provided with a limiting actuator (63) for operation, the differential lock mechanism (59) is provided with a lock actuator (67) for operation, and the limiting actuator (63) and the lock actuator (67) are independently arranged in both sides of the differential case (45).

13 Claims, 8 Drawing Sheets

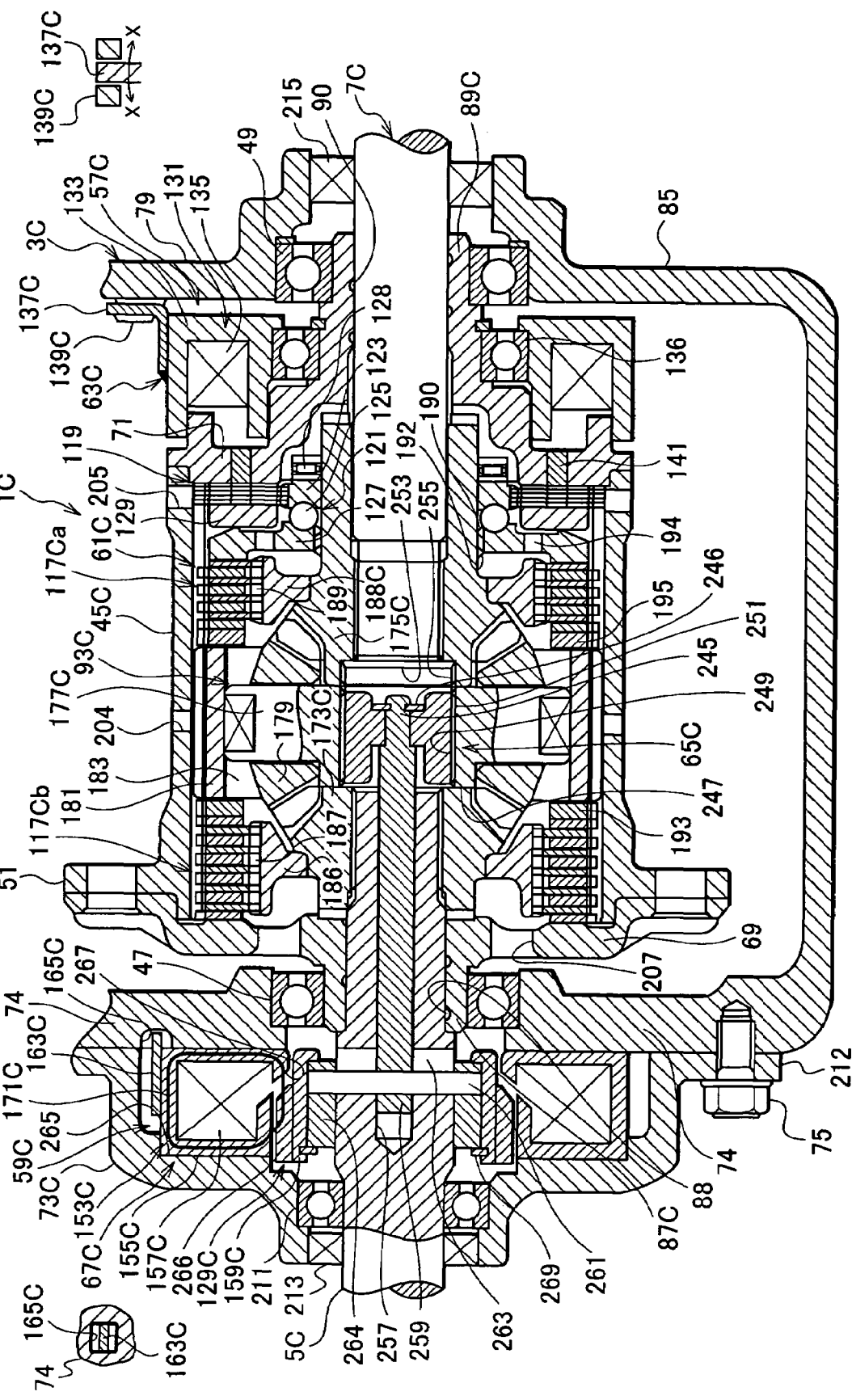

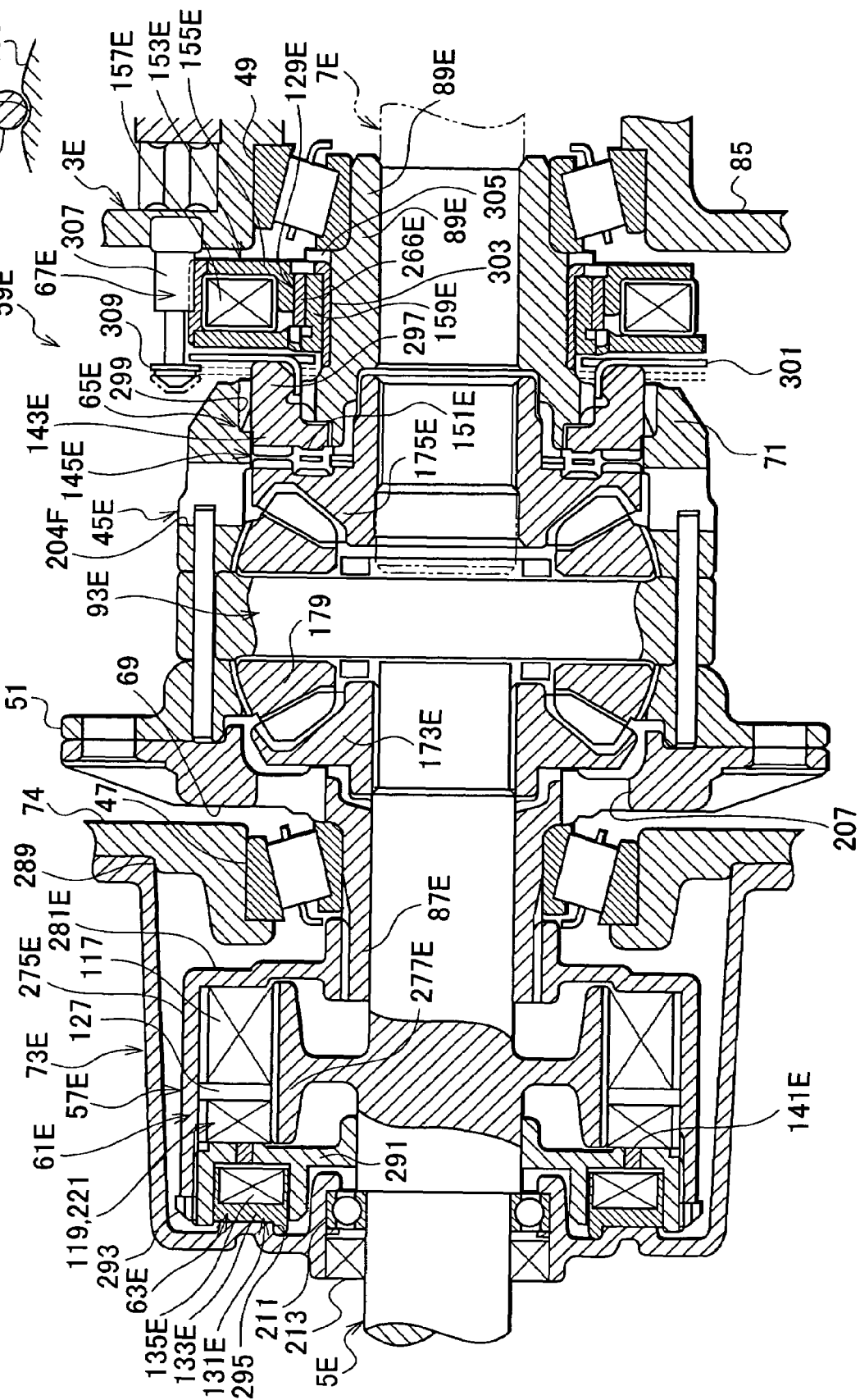

DIFFERENTIAL UNIT

BACKGROUND OF THE INVENTION

1. Field of the Invention

The present invention relates to a differential unit which can execute a differential limit and a differential lock.

2. Description of the Related Art

In a conventional differential unit there is a structure which controls to fasten a multiple disc friction clutch on the basis of an electromagnetic force so as to limit a differential rotation of the differential unit. In this differential unit it is possible to obtain an appropriate handling property in correspondence to, for example, a weather condition, a road surface condition and a traveling condition in an on-road state, by controlling a differential limit force generated by the multiple disc friction clutch in correspondence to traveling conditions.

In an off-road traveling, there is a case that the differential rotation of the differential unit is locked up in accordance with a demand of an accomplishing property. At this time, in the differential unit if the fastening force of the multiple disc friction clutch is strengthened by increasing the electromagnetic force, it is physically possible to lock up the differential rotation of the differential unit.

However, it is necessary to significantly increase capacities of the electromagnet and the multiple disc friction clutch in order to obtain a predetermined lockup torque. Accordingly, there is actually a risk that an increase of weight and an increase of size are generated. Further, when the differential rotational force having an excessive load is input the multiple disc friction clutch slips, and there is a risk that an abnormal noise is generated (for example, refer to Japanese Unexamined Patent Publication No. 2000-240685 and Japanese Unexamined Patent Publication No. 2003-232432).

SUMMARY OF THE INVENTION

An object of the present invention is to provided a differential unit which inhibits an increase of size and an increase of weight of the apparatus while securely executing a limit and a lockup of a differential rotation, and can inhibit an abnormal noise at a time of the lockup.

According to a first aspect of the present invention, a most main feature is what a differential limiting mechanism capable of limiting a differential rotation and a differential lock mechanism capable of locking up the differential rotation are independently provided.

Accordingly, it is possible to limit the differential rotation of the differential mechanism by the differential limiting mechanism, and it is possible to lock up the differential rotation by the differential lock mechanism independently from the differential limit.

Accordingly, it is not necessary to constrainedly lock up the differential rotation of the differential mechanism by the differential limiting mechanism, and it is possible to inhibit the differential limiting mechanism from being increased in size. Since the differential lock mechanism executes only the lockup, it is possible to inhibit the differential lock mechanism from being increased in size.

Therefore, it is possible to form an entire structure compact as a result of independently arranging the functions of the respective mechanisms.

According to a second aspect of the present invention, the differential mechanism is provided with an output coupling portion connected to one of the output rotation members, and the differential limiting mechanism or the differential lock mechanism limits or locks up the differential rotation between the input rotation member and the output rotation member or the output coupling portion.

Accordingly, it is possible to simplify the structure of the connecting path by arranging one of the differential limiting mechanism and the differential lock mechanism between the input rotation member and output rotation members or the output coupling portions arranged in adjacent to the input rotation member. Further, it is possible to inhibit modification of the members of the differential mechanism within the input rotation member such as the differential case to the utmost.

According to a third aspect of the present invention, the differential mechanism is provided with output coupling portions connected to the output rotation members, the differential limiting mechanism limits the differential rotation between a pair of output rotation members or between a pair of output coupling portions, and the differential lock mechanism locks up the differential rotation between the input rotation member and one of the output rotation members or one of the output coupling portions.

Accordingly, it is possible to simplify the structure. In other words, the differential limiting mechanism can directly apply a transmission of the differential limiting force to a portion between a pair of output rotation members or a portion between a pair of output coupling portions, and it is possible to simplify the structure. The differential lock mechanism can directly apply a transmission of the lockup force to a portion between the input rotation member and the output rotation members or the output coupling portions, it is easy to arrange the lockup force, and it is possible to simplify the structure of the connecting path.

In accordance with a fourth aspect of the present invention, the differential lock mechanism is provided with a rod transmitting the operating force in one axial portion of the output rotation member.

Accordingly, it is possible to easily add the differential lock mechanism without changing the input rotation member and the bearings and the like.

According to a fifth aspect of the present invention, the input rotation member is constituted by a differential case receiving and supporting the differential mechanism, the differential case is provided with an input portion receiving the rotation input in one end side in a direction of the rotation axis, the differential limiting mechanism is arranged in the input portion side of the differential case, and the differential lock mechanism is arranged in the other end side in the direction of the rotational axis of the differential case.

Accordingly, it is possible to form compact structurally. Further, it is possible to arrange the differential lock mechanism in the other side of the differential case in which a space capacity tends to be limited, it is possible to arrange the differential limiting mechanism in the input portion side of the differential case in which the space capacity tends to be secured, and it is possible to improve a balance in layout.

According to a sixth aspect of the present invention, the input rotation member is constituted by a differential case receiving and supporting the differential mechanism, the differential case is rotatably supported to a differential carrier, and the differential case, the differential limiting mechanism and the differential lock mechanism are received and arranged within the differential carrier.

Accordingly, it is possible to finish an assembly in the differential carrier side in the space within the differential carrier. Further, it is possible to sufficiently cool an entire of the apparatus by a lubricating oil within the differential carrier.

According to with a seventh aspect of the present invention, the input rotation member is constituted by a differential case receiving and supporting the differential mechanism, the differential case is rotatably supported to a differential carrier via a bearing, one of the differential limiting mechanism and the differential lock mechanism is arranged between the differential case and the bearing, and the other thereof is arranged in an outer side in an axial direction of the bearing with respect to the differential case.

Accordingly, it is possible to inhibit an increase of a bearing span of the differential case, it is possible to improve a supporting rigidity, and it is possible to improve a freedom of shape selection of the other. In other words, since the other of the differential limiting mechanism and the differential lock mechanism is arranged in an outer side in an axial direction of the bearing with respect to the differential case, and gets relief from a restriction in layout between the bearing and the differential case, it is possible to comparatively freely select a capacity, a property and the like of the mechanism.

According to an eighth aspect of the present invention, the differential carrier is detachably provided with a receiving portion arranged in an outer side in an axial direction of the bearing, and the other of the differential limiting mechanism and the differential lock mechanism is arranged in the receiving portion.

Accordingly, it is possible to improve an assembling property of the other of the differential limiting mechanism and the differential lock mechanism. Further, it is possible to select with or without of an additional layout in correspondence to necessity of the other mechanism for the differential unit, by approximately setting the structures for connecting, supporting and sealing in a sectional manner of the receiving portion.

According to a ninth aspect of the present invention, the receiving portion is fixed to a side wall of the differential carrier.

Accordingly, it is possible to easily attach the receiving portion.

According to a tenth aspect of the present invention, the differential limiting mechanism is arranged in the receiving portion.

Accordingly, it is possible to improve a supporting rigidity by arranging the differential limiting mechanism requiring more placing space in comparison with the differential lock mechanism in the outer portion of the bearing span. Further, since the differential limiting mechanism gets relief from the restriction in layout between the bearing and the differential case, it is possible to comparatively freely select the capacity, the property and the like of the mechanism.

According to an eleventh aspect of the present invention, the differential lock mechanism is arranged in the receiving portion.

Accordingly, it is possible to largely improve a traveling stability of a vehicle by employing a structure in which the differential limiting mechanism is normally mounted. Further, it is possible to widely improve a productivity by additionally arranging the differential lock mechanism according to a request.

According to a twelfth aspect of the present invention, the input rotation member is constituted by a differential case receiving and supporting the differential mechanism, the differential limiting mechanism is provided with a limit actuator for operation, the differential lock mechanism is provided with a lock actuator for operation, and the limit actuator and the lock actuator are independently arranged in both sides of the differential case.

Accordingly, it is possible to arrange the respective mechanism so as to divide right and left by setting the mounted layout of the differential case as a principal point, and it is possible to arrange the respective mechanisms in an unforced manner.

According to a thirteenth aspect of the present invention, the limiting actuator and the lock actuator are respectively arranged in and faced to both side walls in a direction of the rotational axis of the differential case.

Accordingly, it is possible to inhibit an increase of length in the direction of the rotational axis of the differential unit.

According to a fourteenth aspect of the present invention, the limiting actuator and the lock actuator transmit an actuating force via both side walls in the direction of the rotation axis of the differential case.

Accordingly, it is possible to transmit the actuating force of the differential limiting mechanism and the differential lock mechanism in the direction of the rotational axis, so that the actuating force can be transmitted in an unforced manner.

According to a fifteenth aspect of the present invention, the differential case is rotatably supported to the differential carrier, and the limiting actuator and the lock actuator are supported to the differential carrier.

Accordingly, since it is possible to support at a short distance, it is possible to stably support the actuator, and it is possible to easily assemble.

According to a sixteenth aspect of the present invention, the differential case is rotatably supported to the differential carrier via the bearing, and the limiting actuator and the lock actuator are independently arranged between the differential case and the bearing.

Accordingly, it is possible to arrange both the actuators within the bearing span of the differential case, and it is possible to entirely form the unit compact while securing the supporting rigidity of the differential case.

BRIEF DESCRIPTION OF THE DRAWINGS

FIGS. 2A, 2B and 2C show layouts of a differential unit, a differential limiting mechanism, and a differential lock mechanism according to the present invention, in which FIG. 2A is a skeleton cross sectional view showing a first layout example, FIG. 2B is a skeleton cross sectional view showing a second layout example, and FIG. 2C is a skeleton cross sectional view showing a third layout example;

FIG. 6A is a cross sectional view showing a rear differential unit and a periphery thereof according to a fourth embodiment of the present invention;

FIG. 6B is an explanatory view showing an engagement of a limiting actuator with respect to a differential carrier according to the fourth embodiment;

FIG. 6C is an explanatory view showing an engagement of a lock actuator with respect to the differential carrier according to the fourth embodiment;

FIG. 8A is a cross sectional view showing a rear differential unit and a periphery thereof according to a sixth embodiment of the present invention; and FIG. 8B is an explanatory view showing an engagement of a lock actuator with respect to a differential carrier according to with the sixth embodiment.

DESCRIPTION OF PREFERRED EMBODIMENT

Figure 1:
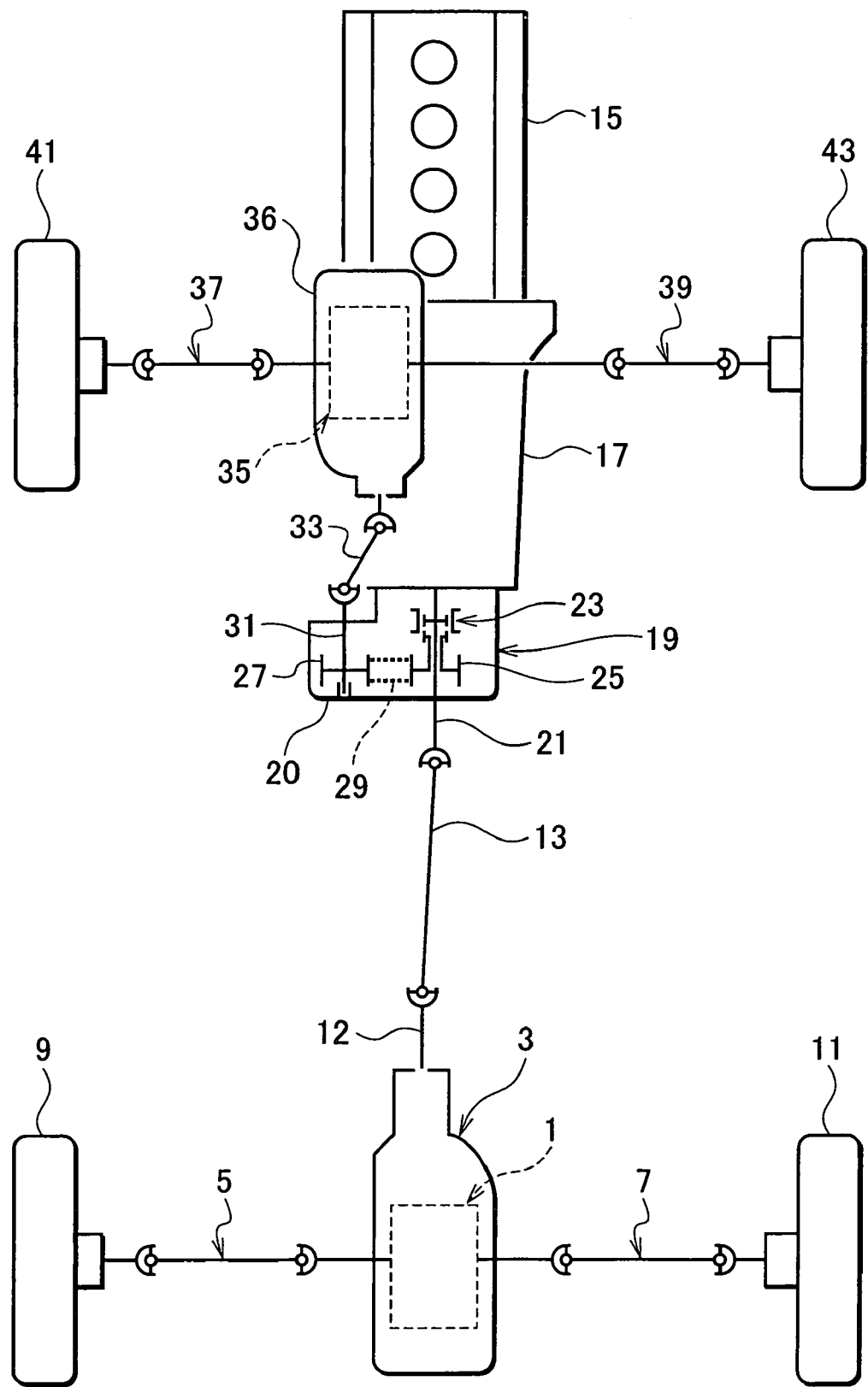
FIG. 1 is a skeleton plan view of a four-wheel drive vehicle according to a first embodiment of the present invention.

The object of inhibiting the increase in size and the abnormal noise from being generated while appropriately executing the differential limit and the differential lock is achieved by independently providing a differential lock mechanism and a differential limiting mechanism First Embodiment FIG. 1 is a skeleton plan view of a four-wheel drive vehicle to which an first embodiment according to the present invention is applied. A differential unit in accordance with the first embodiment of the present invention is applied, for example, as a rear differential unit 1, and is rotatably supported to a differential carrier 3. The rear differential unit 1 is connected and interlocked to left and right rear wheels 9 and 11 via left and right axle shafts 5 and 7.

A rotational force of a propeller shaft 13 is input to the rear differential unit 1 via a drive pinion shaft 12. A rotational force is transmitted to the propeller shaft 13 from an engine 15 via a transmission 17 and a transfer 19.

A trans on shaft 21 is supported to a transfer case 20 of the transfer 19. The transmission shaft 21 is provided with an interrupting mechanism 23 and a sprocket 25. A chain 29 is wound around the sprocket 25 with respect to the other sprocket 27. The sprocket 27 is fixed to an output shaft 31 to a front wheel side. The output shaft 31 is connected to a propeller shaft 33, and a rotational force is transmitted to a front differential unit 35 from the propeller shaft 33. The front differential unit 35 is rotatably supported to a differential carrier 36. The front differential unit 35 is connected and interlocked to left and right front wheels 41 and 43 via left and right axle shafts 37 and 39.

Accordingly, the rotational force output from the engine 15 is transmitted to the transfer 19 through the transmission 17. When the interrupting mechanism 23 of the transfer 19 is in a connected state, the rotational force from the transmission 17 is transmitted to the propeller shaft 13 in the rear wheel side from the transmission shaft 21 on one hand, and is transmitted to the propeller shaft 33 in the front wheel side via the interrupting mechanism 23, the sprocket 25, the chain 29, the sprocket 27 and the output shaft 31 on the other hand.

The rotational force is transmitted to the rear differential unit 1 from the propeller shaft 13 in the rear wheel side, and the rotational force is transmitted to the left and right rear wheels 9 and 11 from the rear differential unit 1 via the left and right axle shafts 5 and 7.

The rotational force is transmitted to the front differential unit 35 from the propeller shaft 33 in the front wheel side, and the rotational force is transmitted to the left and right front wheels 41 and 43 from the front differential unit 35 via the left and right axle shafts 37 and 39.

Accordingly, it is possible to travel in a four-wheel drive state by the left and right front wheels 41 and 43 and the left and right rear wheels 9 and 11.

When the interrupting mechanism 23 of the transfer 19 is in a disconnected state, the rotational force is transmitted only to the propeller shaft 13 in the rear wheel side from the transmission 17 via the transmission shaft 21. Therefore, it is possible to travel in a two-wheel drive state by the rear wheels 9 and 11.

Figure 2A:
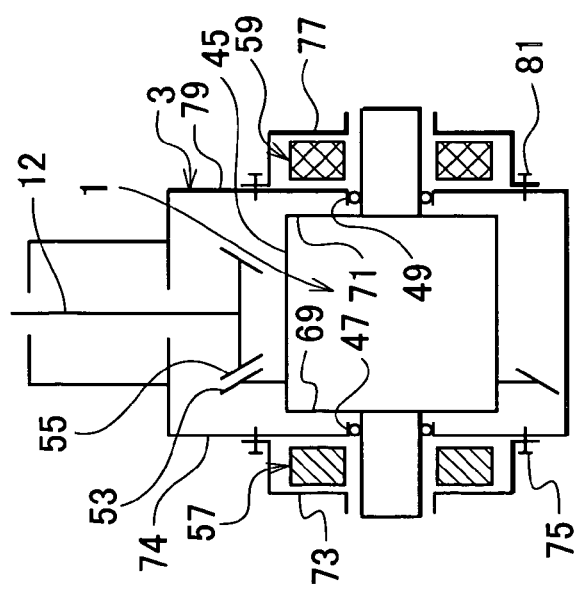
Figure 2B:
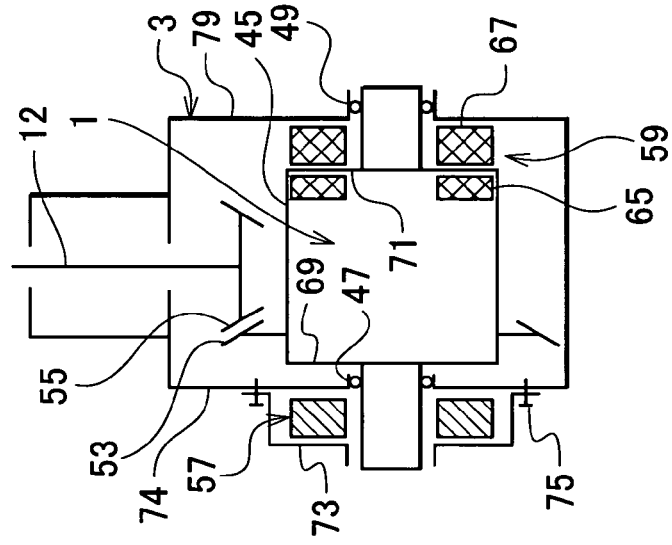
Figure 2C:
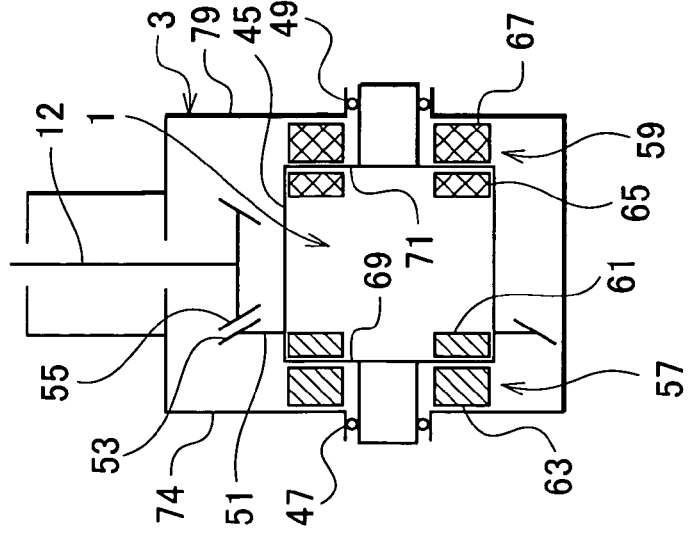

FIGS. 2A, 2B and 2C show layouts of a rear differential unit a differential limiting mechanism, and a differential lock mechanism of the present invention, in which FIG. 2A is a skeleton plan view showing a first layout example, FIG. 2B is a skeleton plan view showing a second layout example, and FIG. 2C is a skeleton plan view showing a third layout example.

The first embodiment corresponds to the first layout example in FIG. 2A. However, the first to third layouts in FIGS. 2A, 2B and 2C are previously explained by using the same reference numerals as a matter of convenience for explanation.

As shown in FIG. 2A, the rear differential unit 1 is provided with a differential case 45 as an input rotation member in accordance with the present embodiment. A differential mechanism is received and supported within the differential case 45. A rotational force is transmitted to the axle shafts 5 and 7 (FIG. 1) serving as a pair of output rotation members from the differential case 45 via the differential mechanism so as to allow a differential rotation.

The differential case 45 is rotatably supported to the differential carrier 3 via bearings 47 and 49. The differential case 45 is formed approximately in a cylindrical shape, and is provided with a coupling flange 51 as an input portion for receiving the rotation input in one side in a direction of a rotational axis. A ring gear 53 is attached to the coupling flange 51. A driven pinion gear 55 is engaged with the ring gear 53. The drive pinion gear 55 is attached to the drive pinion shaft 12.

The rear differential unit 1 is independently provided with a differential limiting mechanism 57 which can limit the differential rotation, and a differential lock mechanism 59 which can lock up the differential rotation.

The differential case 45, the differential limiting mechanism 57, and the differential lock mechanism 59 are received and arranged within the differential carrier 3. The differential limiting mechanism 57 is arranged in the coupling flange 51 side, and the differential lock mechanism 59 is arranged in the other side of the differential case 45.

The differential limiting mechanism 57 limits the differential rotation of the differential mechanism and is provided with a limiting mechanism portion 61 and a limiting actuator 63 for operation. The differential lock mechanism 59 locks up the differential rotation of the differential mechanism, and is provided with a lock mechanism portion 65 and a lock actuator 67 for operation.

The limiting mechanism portion 61 and the lock mechanism portion 65 are arranged within the differential case 45. The limiting actuator 63 and the lock actuator 67 are independently arranged in both sides of the differential case 45. The limiting actuator 63 and the lock actuator 67 are respectively arranged in and faced to both side walls 69 and 71 in a direction of the rotational axis of the differential case 45. The limiting actuator 63 and the lock actuator 67 are independently arranged between the differential case 45 and the bearings 47 and 49.

The limiting actuator 63 and the lock actuator 67 transmit an actuating force to the limiting mechanism portion 61 and the lock mechanism portion 65 within the differential case 45 via both the side walls 69 and 71 in the direction of the rotational axis of the differential case 45, respectively.

Further, when the rotation is input to the coupling flange 51 from the drive pinion shaft 12 via the drive pinion gear 55 and the ring gear 53, the differential case 45 is rotated, and the rotational force is transmitted the left and right axle shafts 5 and 7 (FIG. 1) via the differential mechanism so as to allow the differential rotation.

At this time, if the limiting mechanism portion 61 is actuated by the limiting actuator 63, it is possible to limit the differential rotation between the axle shafts 5 and 7. Further, if the lock mechanism portion 65 is actuated by the lock actuator 67, it is possible to lock up the differential rotation between the axle shafts 5 and 7.

Accordingly, the differential limiting mechanism 57 and the differential lock mechanism 59 only have to be designed so as to appropriately achieve respective original differential limiting function and lockup function. As a result, it is not necessary to constrainedly increase a size of the differential limiting mechanism 57. As this result, it is possible to form the differential unit 1 compact as a whole.

In the second layout example in FIG. 2B, the differential carrier 3 is provided with a receiving cover 73 serving as a receiving portion. The receiving cover 73 is fixed to a side wall 74 of the differential carrier 3 by bolt 75. The differential limiting mechanism 57 is arranged within the receiving cover 73. Namely, the differential limiting mechanism 57 is arranged in an outer side in a axial direction of the bearing 47 with respect to the differential case 45.

In the third layout example in FIG. 2C, receiving covers 73 and 77 arranged in outer sides in the axial direction of the bearings 47 and 49 are detachably fixed to both the side walls 74 and 79 of a differential carrier 3B by bolts 75 and 81. The differential limiting mechanism 57 is arranged within the receiving cover 73, and the differential lock mechanism 59 is arranged within the receiving cover 77.

In this case, in FIGS. 2A to 2C, the arranged positions of the differential limiting mechanism 57 and the differential lock mechanism 59 may be mutually replaced.

Next, a description will be given of details of the differential unit.

Figures 3A, 3B:
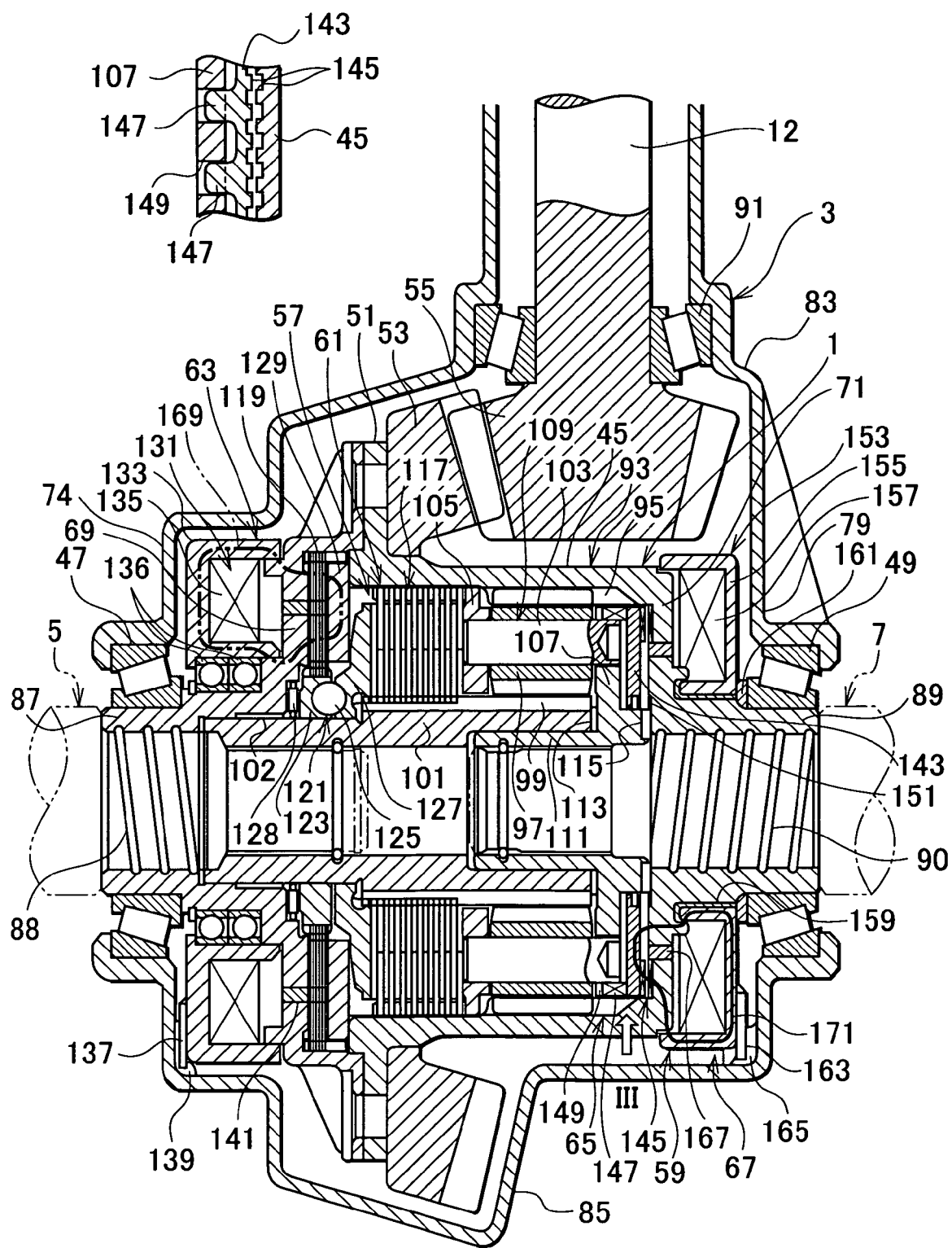
FIG. 3A is a cross sectional view showing a rear differential unit and a periphery thereof according to the first embodiment of the present invention.
FIG. 3B is an enlarged sectional view of a main portion showing a lock mechanism portion as seen from a direction of an arrow III in FIG. 3A.

FIG. 3 compounds to FIG. 2A. FIG. 3A is a cross sectional view showing the rear differential unit and a periphery thereof, and FIG. 3B is an enlarged sectional view of the main portion showing the lock mechanism portion as seen from a direction of an arrow III in FIG. 3A.

As shown in FIG. 3A, the rear differential unit 1, the differential limiting mechanism 57, and the differential lock mechanism 59 are received and arranged within the differential carrier 3. The differential carrier 3 includes a main body 83 and a rear cover 85. The main body 83 and the rear cover 85 are divided into front and rear sections (front and ear sections of a vehicle body) along a rotational axis of the differential case 45, and are fastened and fixed to each other by bolt and nut or the like. The driven pinion shaft 12 is rotatably supported to the differential carrier 3 by pinion bearings 91.

The differential case 45 of the rear differential unit 1 includes left and right boss portions 87 and 89. The left and right boss portions 87 and 89 are rotatably supported to the differential carrier 3 via the bearings 47 and 49. Spiral oil grooves 88 and 90 are provided in inner peripheries of the boss portions 87 and 89, respectively.

A differential mechanism 93 structured by a planetary gear mechanism is provided within the differential case 45. The differential mechanism 93 includes an internal gear 95, an outside planetary gear 97, an inside planetary gear (not shown), a sun gear 99 and the like.

The internal gear 95 is formed in an inner periphery of the differential case 45, and the sun gear 99 is formed in one hub 101. The hub 101 is supported to the differential case 45 side via a slidable ring 102 so as to be relatively rotatable. The hub 101 is connected to the axle shaft 5 corresponding to an output rotation member. According to the present embodiment, the hub 101 serves as an output coupling portion.

The outside planetary gear 97 and the inside planetary gear are engaged with each other, the outside planetary gear 97 is engaged with the internal gear 95, and the inside planetary gear is engaged with the sun gear 99.

The outside planetary gear 97 and the inside planetary gear are rotatably supported to a carrier pin 103. The carrier pin 103 is supported by carrier plates 105 and 107. The carrier pin 103, and the carrier plates 105 and 107 structure a planetary carrier 109.

The carrier plate 107 is integrated with the other hub 111. The hub 111 is connected to the axle shaft 7 corresponding to the output rotation member. According to the present embodiment, the hub 111 serves as the output coupling portion.

Slidable washers 113 and 115 are interposed between the hubs 101 and 111 in an axial direction, and between the hub 111 and the differential case 45 in an axial direction respectively.

The limiting mechanism portion 61 includes a limiting clutch 117 which can apply and release a pressing force, a pilot clutch 119 fastened on the basis of an operation of the limiting actuator 63, and a cam mechanism 121 actuated by the fastening of the pilot clutch 119 and the differential rotation.

The limiting clutch 117 and the pilot clutch 119 are structured by a wet-type multiple disc clutch. The limiting clutch 117 is interposed between the differential case 45 and the hub 101, and is adjacent to the carrier plate 105. Outer plates of the limiting clutch 117 are splined to the differential case 45, and inner plates are splined to the hub 101.

The pilot clutch 119 is arranged between the differential case 45 and the cam ring 123. Outer plates of the pilot clutch 119 are splined to an inner periphery of the differential case 45, and inner plates are splined to the cam ring 123.

The cam mechanism 121 is structured by a ball cam, and the cam ball 125 is interposed between cam surfaces of the cam ring 123 and a pressure plate 127. The pressure plate 127 is engaged with the hub 101 in a rotational direction, and is movable in an axial direction. Thrust needle bearings 128 is interposed between the cam ring 123 and the side wall 69 of the differential case 45.

The limiting actuator 63 is constituted by an electromagnetic actuator, and includes an electromagnet 131 attracting an armature 129. The armature 129 is arranged in adjacent to one side of the pilot clutch 119.

The electromagnet 131 includes a yoke 133 and an electromagnetic coil 135. The yoke 133 is borne to the differential case 45 side by a bearing 136. The yoke 133 includes an engagement portion 137. The engagement portion 137 is engaged with a locking portion 139 in the differential carrier 3 side, whereby the yoke 133 is prevented from rotating. Namely, the limiting actuator 63 is supported to the differential carrier 3. In order to prevent a magnetic flux of the electromagnet 131 from shorting, the side wall 69 of the differential case 45 is provided with a non-magnetic material ring 141 made from by, for example, a stainless steel or the like.

The lock mechanism portion 65 of the differential lock mechanism 59 includes a lock ring 143, as shown in FIGS. 3A and 3B. A dog clutch 145 capable of meshing, engaging and disengaging is provided between the lock ring 143 and the differential case 45. An engagement convex portion 147 of the lock ring 143 is engaged with an engagement concave portion 149 in an outer periphery of the carrier plate 107. A spring 151 is interposed between the lock ring 143 and the differential case 45. The spring 151 energizes the lock ring 143 to the carrier plate 107 side with respect to the differential case 45.

The lock actuator 67, which is structured by an electromagnetic actuator, includes an electromagnet 153. The electromagnet 153 includes a yoke 155 and an electromagnetic coil 157. The yoke 155 is supported to an outer periphery of the boss portion 89 of the differential case 45 via a non-magnetic material ring 159 made from, for example, a stainless steel or the like, so that the yoke 155 relatively rotates with respect to the boss portion 89. A non-magnetic material washer 161 made from, for example, a stainless steel or the like is interposed between the yoke 155 and the bearings 49. The yoke 155 includes an engagement portion 163 which is engaged with a locking portion 165 provided with the differential carrier 3 side in a rotational direction to be locked. Accordingly, the lock actuator 67 is supported to the differential carrier 3 side.

In order to prevent a magnetic flux of the electromagnet 153 from shorting, a non-magnetic material ring 167 made from, for example, a stainless steel or the like is provided in the side wall 71 of the differential case 45.

Next, a description will be given of an operation.

When both of the limiting actuator 63 and the lock actuator 67 are not controlled to be excited, the differential limiting by the differential limiting mechanism 57 and the differential lockup by the differential locking mechanism 59 are not executed. Accordingly, the rotational force is transmitted to the differential case 45 from the drive pinion shaft 12 via the drive pinion gear 55, the ring gear 53 and the coupling flange 51. The rotational force is transmitted to the left and right hubs 101 and 111 via the differential mechanism 93, and is driven and output to the left and right axle shafts 5 and 7 from the left and right hubs 101 and 111.

When the differential rotation is generated between the left and right axle shafts 5 and 7 in the rotation output, the planetary gear 97 in the outer side and the planetary gear in the inner side rotate on their axis and orbitally rotate with respect to the internal gear 95. As this result, it is possible to allow the differential rotation between the left and right hubs 101 and 111 while transmitting the rotational force to the left and right hubs 101 and 111 via the differential mechanism 93 from the differential case 45.

Accordingly, it is possible to allow the differential rotation while transmitting the rotational force to the left and right axle shafts 5 and 7 side from the drive pinion shaft 12 side, and it is possible to execute a cornering travel or the like in an unforced manner.

When controlling to excite the limiting actuator 63, the electromagnet 131 is excited, a magnetic force loop 169 is formed and the armature 129 is sucked. The pilot clutch 131 is fastened on the basis of the suction of the armature 129, and a pilot torque is generated.

If the left and right rear wheels 9 and 11 start the differential rotation in a state in which the pilot torque is generated in the pilot clutch 131, the hubs 101 and 111 start the differential rotation with respect to the differential case 45. This makes the cam surfaces of the cam ring 123 and the pressure plate 127 shift to front and rear sides in the rotational direction with respect to the cam ball 125. The cam ball 125 runs on the cam surface due to the displacement motion of the cam surfaces on the basis of the shifts and the cam mechanism 121 is operated so as to generate a thrust. The thrust is received by the side wall 69 of the differential case 45 via the thrust needle bearing 128, the pressure plate 127 is moved by a reaction force thereof, and the limiting clutch 117 is fastened by applying the pressing force.

If the limiting clutch 117 is fastened as mentioned above, the relative rotation between the differential case 45 and the hub 101 is limited, so that the differential rotation of the differential mechanism 93 is limited between the hubs 101 and 111. A differential limiting force is applied between the left and right rear wheels 9 and 11 on the basis of the limit of the differential rotation of the hub 101 and 111. The differential limiting force can be controlled by a controller or the like in correspondence to a drive condition, a road surface condition or the like, and thereby it is possible to widely improve a handling property.

In this case, if the exciting control of the electromagnet 131 is cancelled, the pilot torque according to the pilot clutch is cancelled, and the rotation of the cam ring 123 becomes free. Accordingly, the cam ring 123 can rotate along with the pressure plate 127 via the cam ball 125, and the thrust according to the cam mechanism 121 is released. The fastening of the limiting clutch 117 is cancelled on the basis of the thrust release, so that the differential rotation according to the differential mechanism 93 becomes again free.

In traveling on a punishing road or the like, there is a case that the lockup of the differential rotation is necessary. At this time, the electromagnet 153 of the lock actuator 67 is controlled to be excited. The magnetic force loop 171 is formed on the basis of the exciting control and the lock ring 143 is sucked.

The lock ring 143 is moved on the basis of the suction, and the dog clutch 145 is engaged. The lock ring 143 locks the differential case 45 and the carrier plate 107 on the basis of the engagement the dog clutch 145. This lock makes the differential rotation of the differential mechanism 93 lock up, and thereby the differential rotation of the left and right rear wheels 9 and 11 is locked.

In this state, if the exciting control of the electromagnet 153 is cancelled, the lock ring 143 is moved to the original position on the basis of the energizing force of the spring 151. As this result, the dog clutch 145 is disengaged, so that the lockup of the differential mechanism 93 is immediately cancelled on the basis of the disengagement.

It is possible to widely improve an accomplishing performance on the punishing road on the basis of the lockup of the differential rotation as mentioned above. Further, even if the differential limiting mechanism 57 is operated, it is possible to immediately operate the differential lock mechanism 59 while maintaining the differential limiting force of the differential limiting mechanism 57 as it is in correspondence to the road surface condition. When the road surface condition is recovered, the differential limiting mechanism 57 can maintain the differential limiting state just before the lockup by immediately setting the differential lock mechanism 59 to the non-operating state. Accordingly, it is possible to execute an appropriate differential limiting and lockup in correspondence to various traveling conditions on the basis of cooperation of the differential limiting mechanism 57 and the differential lock mechanism 59. Namely, it is possible to improve a handling property on the on-road, and the accomplishing performance on the off-road.

According to the first embodiment of the present invention, the rear differential unit 1 is independently provided with the differential limiting mechanism 57 which can limit the differential rotation, and the differential lock mechanism 59 which can lock up the differential rotation. Therefore, the differential rotation of the differential mechanism can be limited by the differential limiting mechanism 57 and the differential rotation of the differential mechanism can be locked up by the differential lock mechanism 59 independently from the differential limiting. Accordingly, it is not necessary to constrainedly lock up by the differential limiting mechanism 57, and it is possible to inhibit the differential limiting mechanism 57 from being increased in size. Since the differential lock mechanism 59 executes only the lockup, it is possible to inhibit the differential lock mechanism 59 from being increased in size. Therefore, as a result, the differential unit 1 can be formed in compact as a whole by independently arranging the functions of the respective mechanisms.

The differential limiting mechanism 57 limits the differential rotation between the differential case 45 and the hub 101, and the differential lock mechanism 59 locks up the differential rotation between the differential case 45 and the hub 111. Therefore, it is possible to simplify the structure of the connecting path by respectively arranging both the mechanisms 57 and 59 between the differential case 45 and the hubs 101 and 111 arranged in adjacent to each other. Further, it is possible to inhibit the members of the differential mechanism 93 within the differential case 45 from being changed to the utmost.

The differential rotation mechanism 57 is arranged in the coupling flange 51 side of the differential case 45, and the differential lock mechanism 59 is arranged in the other side of the differential case 45. Therefore, it is possible to form the structure compact. Further, it is possible to arrange the differential lock mechanism 59 in the other side of the differential case 45 in which the space capacity tends to be limited, and it is possible to arrange the differential limiting mechanism 57 in the coupling flange 51 side of the differential case 45 in which the space capacity tends to be secured. Accordingly, it is possible to improve a balance in layout.

The differential case 45, the differential limiting mechanism 57 and the differential lock mechanism 59 are received and arranged within the differential carrier 3. Therefore, it is possible to finish the assembly of the differential carrier 3 side in the space within the differential carrier 3. Further, an entire of the apparatus can be sufficiently cooled by the lubricating oil within the differential carrier 3.

The limiting actuator 63 and the lock actuator 67 are arranged independently in both sides of the differential case 45. Therefore, it is possible to arrange the respective mechanisms 57 and 59 in an unforced manner while dividing right and left by setting the mounted layout of the differential case 45 as a principal point so as to inhibit the layout structure of the differential case 45 from being changed.

The limiting actuator 63 and the lock actuator 67 are respectively arranged in both side walls 69 and 71 in the direction of the rotational axis of the differential case 45 so as to face the actuators 63 and 67 to both side walls 69 and 71 respectively. Therefore, it is possible to inhibit the length in the direction of the rotational axis of the differential unit 1 from being increased.

The limiting actuator 63 and the lock actuator 67 transmit the actuating force via both the side walls 69 and 71 in the direction of the rotational axis of the differential case 45 such that the magnetic force loops 169 and 171 are formed. Therefore, it is possible to transmit the actuating forces of the differential limiting mechanism 57 and the differential lock mechanism 59 in the direction of the rotational axis in an unforced manner.

The limiting actuator 63 and the lock actuator 67 are supported to the differential carrier 3 so as to be engaged in the rotational direction. Therefore, it is possible to stably support the differential case 45 at a short distance and it is possible to easily assemble the unit 1.

The limiting actuator 63 and the lock actuator 67 are independently arranged between the differential case 45 and the bearings 47 and 49, respectively. Therefore, it is possible to range both the actuators 63 and 67 within the bearing span of the differential case 45, so that the differential unit 1 can be formed in compact as a whole while securing the supporting rigidity of the differential case 45.

Second Embodiment

Figure 4:
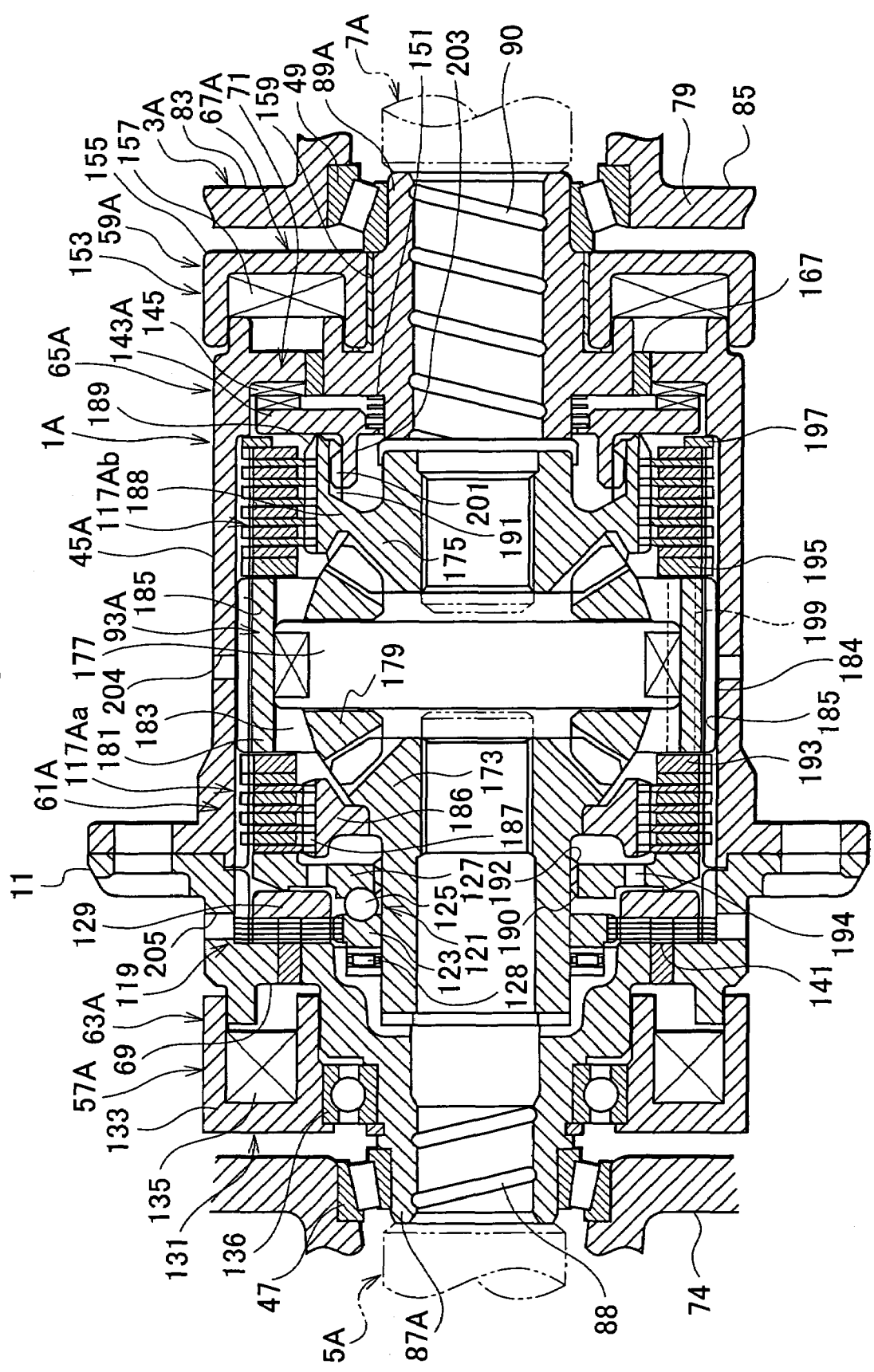
FIG. 4 is a cross sectional view showing a rear differential unit and a periphery thereof according to a second embodiment of the present invention.

FIG. 4 is a cross sectional view of a rear differential unit and a periphery thereof according to a second embodiment. The present embodiment corresponds to FIG. 2A, and a basic structure is the same as that of the first embodiment in FIG. 3. In the following explanation of the second embodiment, elements corresponding to those of the first embodiment are represented with like reference numerals or like reference numerals with A.

As shown in FIG. 4, in the present embodiment, a bevel gear-type mechanism is applied as a differential mechanism 93A, and limiting clutches 117Aa and 117Ab are divisionally interposed between a differential case 45A and left and right side gears 173 and 175 side, respectively.

The differential mechanism 93A includes side gears 173 and 175, a pinion shaft 177, and a pinion gear 179. Both side gears 173 and 175 are engaged with the pinion gear 179 rotatably supported to the pinion shaft 177. The axle shafts 5 and 7 are connected to the side gears 173 and 175 serving as the output coupling portion. The pinion shat 177 is engaged with an engagement groove 183 provided with a differential mechanism support ring 181. The differential mechanism support ring 181 is splined to an inner spline 185 provided with an inner periphery surface of the differential case 45A.

A clutch engagement portion 186 is fixed to the side gear 173 by a welding or the like, and a spline 187 is integrally provided in an outer peripheral surface of a clutch engagement portion 186. A clutch engagement portion 188 is integrally provided in the side gear 175, and a spline 189 is integrally provided in an outer peripheral surface of the clutch engagement portion 188. An inner spline 191 is provided in an inner peripheral side of the clutch engagement portion 188 as a side surface side of the side gear 175. In this case, the side gear 175 can be formed by a forging.

The limiting clutch 117Aa is interposed between the differential case 45A and the side gear 173. Outer plates of the limiting clutch 117Aa are splined to the inner spline 185 of the differential case 45A, and the inner plates are splined to the spline 187 of the side gear 173. A transmission plate 193 is interposed between the limiting clutch 117Aa and the differential mechanism support ring 181.

The limiting clutch 117Ab is interposed between the differential case 45A and the side gear 175. Outer plates of the limiting clutch 117Ab are splined to the inner spline 185 of the differential case 45A, and the inner plates are splined to the spline 189 of the side gear 175. A transmission plate 195 is interposed between the limiting clutch 117Ab and the differential mechanism support ring 181. The limiting clutch 117Ab is received by a stopper ring 197 attached to the differential case 45A.

On the basis of the layout of the limiting clutches 117Aa and 117Ab, in accordance with the present embodiment) the differential limiting mechanism 57A limits the differential rotation between the differential case 45A and the side gears 173 and 175. The differential lock mechanism 59A locks up the differential rotation between the differential case 45A and the side gear 175.

A transmission rod 199 is interposed between the transmission plates 193 and 195. The transmission rod 199 is arranged so as to extend through the differential mechanism support ring 181 in an axial direction at a position staying away from the engagement groove 183 in a peripheral direction.

The pressure plate 127 of the differential limiting mechanism 57A has an inner spline 190 provided in an inner periphery thereof. The inner spline 90 is splined to a spline 192 provided in the side gear 173.

A lock ring 143A in accordance with the present embodiment includes an annular protruding portion 203 which has a spline 201 in an outer periphery thereof. The spline 201 is splined to the inner spline 191 of the clutch engagement portion 188.

The pressure plate 127 and the differential case 45A are provided with openings 194, 204 and 205 for circulating the lubricating oil.

According to the second embodiment, a driving rotational input from the differential case 45A can be output to the left and right axle shafts 5 and 7 side from the left and right side gears 173 and 175 while allowing the differential rotation by the differential mechanism 93A.

When the differential limiting mechanism 57A is operated as well as the first embodiment, the thrust generated by the cam mechanism 121 as mentioned above is transmitted to the pressure plate 127, the limiting clutch 117Aa, the transmission plate 193, the transmission rod 199, the transmission plate 195 and then limiting clutch 117Ab, and is received by the differential case 45A via the stopper ring 197.

Accordingly, the limiting clutches 117Aa and 117Ab are fastened, and thereby the relative rotation of the side gears 173 and 175 with respect to the differential case 45A is limited. As this result, the differential rotation between the side gears 173 and 175 is limited.

When the differential lock mechanism 59A is operated, the lock ring 143A is moved, the dog clutch 145 is engaged, and the relative rotation of the side gear 175 with respect to the differential case 45A is locked via the lock ring 143A. Accordingly, the differential rotation between the side gears 173 and 175 is locked up.

In this case, the lubricating oil is supplied to the differential mechanism 93A and the pilot clutch 119 through the openings 204 and 205 or the like.

According to the present embodiment, approximately the same operations and effects as those of the first embodiment can be achieved. In addition, in accordance with the present embodiment it is possible to arrange the differential limiting mechanism 57A and the differential lock mechanism 59A while reducing the change of the conventional differential unit applying the bevel gear.

Figures 5A, 5B:
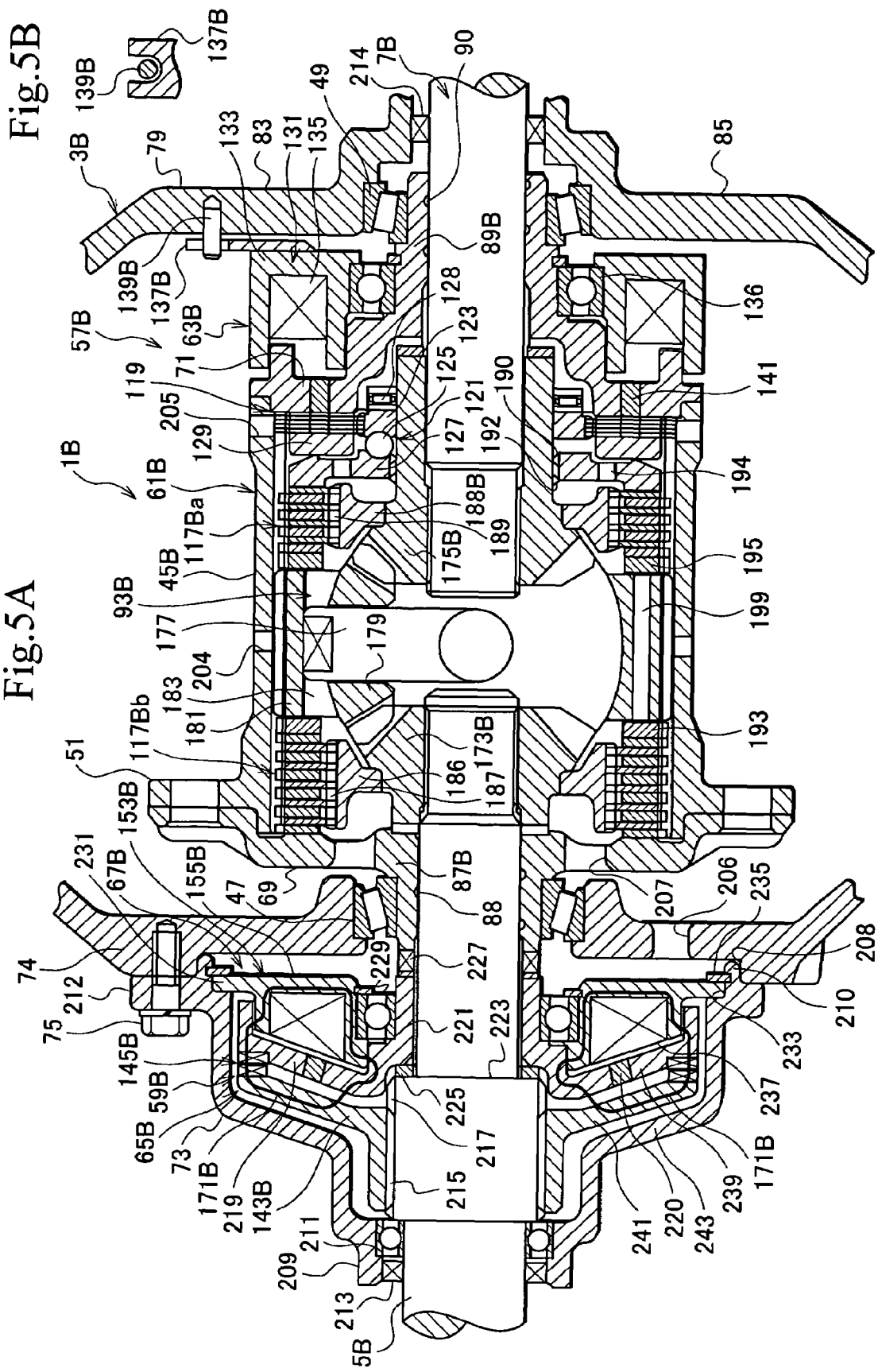
FIG. 5A is a cross sectional view showing a rear differential unit and a periphery thereof according to a third embodiment of the present invention.
FIG. 5B is an explanatory view showing an engagement of a limiting actuator with respect to a differential carrier according to the third embodiment.

The differential limiting mechanism 57A limits the differential rotation between the differential case 45A and the side gears 173 and 175, and the differential lock mechanism 59A locks up the differential rotation between the differential case 45A and the side gear 175. Therefore, it is possible to arrange both the mechanisms 57A and 59A between the side gears 173 and 175 adjacent to the differential case 45A, so that it is possible to simplify the structure of the connecting path. Further, it is possible to inhibit the members of the differential mechanism 93A within the differential case 45A from being changed to the utmost Third Embodiment FIGS. 5A and 5B are views according to third embodiment of the present invention. FIG. 5A is a cross sectional view of a differential unit and a periphery thereof, and FIG. 5B is an explanatory view showing an engagement of a limiting actuator with respect to a differential carrier. The present embodiment corresponds to FIG. 2B. However, in accordance with the present embodiment, the differential lock mechanism is arranged within the receiving cover, in place of the differential lock mechanism. In this case, basic structures of the differential unit and the differential limiting mechanism are approximately the same as those of the second embodiment in FIG. 4. In the following explanation of the third embodiment, elements corresponding to those of the second embodiment are represented with like reference numerals or like reference numerals with B or like reference numerals with B in place of A.

As shown in FIG. 5A, in a differential unit 1B in accordance with the present embodiment, layouts of a differential limiting mechanism 57B and a differential lock mechanism 59B are changed in comparison with the second embodiment. Namely, the differential limiting mechanism 57B is arranged in the other side with respect to the coupling flange 51 of a differential case 45B. A clutch engagement portion 188B provided with a side gear 175B is independently formed as well as the clutch engagement portion 186 in a side gear 173B side, and is secured to the side gear 175B integrally by a welding or the like.

A limiting actuator 63B of the differential limiting mechanism 57B is also supported to a differential carrier 3B. Namely, an electromagnet 131 of the limiting actuator 63B is prevent from rotating by locking an engagement portion 137B fixed to the yoke 133 to a pin-shaped locking portion 139B fixed to the differential carrier 3B.

The coupling flange 51 is additionally provided with openings 207 for circulating the lubricating oil in the differential case 45B, and the side wall 74 side of the differential carrier 3B is provided with openings 206 for circulating the lubricating oil.

The differential lock mechanism 59B is arranged within the receiving cover 73. The receiving cover 73 includes an attachment convex portion 210, having a circulated shape, provided in an attachment flange 212. The side wall 74 of the differential carrier 3B includes an attachment concave portion 208 having a circulated shape in correspondence to the attachment convex portion 210. The attachment convex portion 210 of the receiving cover 73 is fitted to the attachment concave portion 208 of the differential carrier 3B, and the attachment flange 212 is fastened and fixed to the side wall 74 by the bolts 75. Accordingly, the receiving cover 73 is attached to the differential carrier 3B. The receiving cover 73 and the electromagnet are centered by fitting the attachment convex portion 210 to the attachment concave portion 208.

Bearings 211 are interposed between a leading end 209 formed on the receiving cover 73 and the axle shaft 5B. Oil seals 213 and 214 are interposed between the leading end 209 of the receiving cover 73 and the axle shaft 5B and between the other side wall 79 of the differential carrier 3B and the axle shaft 7B, respectively.

A lock ring 143B of the differential lock mechanism 59B includes an inner spline 215 in an inner periphery which is splined to a spline 217 provided with the axle shaft 5B. The lock ring 143B can be engaged and disengaged with resect to the engagement ring 219 by a dog clutch 145B in an outer peripheral side.

The engagement ring 219 includes an engagement boss portion 221 in an inner peripheral side which is fitted to the axle shaft 5B. A sliding washer 225 is interposed between the engagement boss portion 221 and a step portion 223 formed on the axle shaft 5B. The engagement boss portion 221 is meshed and engaged with a boss portion 87B in the differential case 45B side by a concavo-convex shaped engagement portion 227 provided between the engagement boss portion 221 and the boss portion 87B.

An electromagnet 153B is supported to an outer periphery of the engagement boss portion 221 via a bearing 229. A yoke 155B of the electromagnet 153B includes a peripheral flange 231 which is fitted to a positioning concave portion 233 provided with the receiving cover 73 so as to be positioned in a radial direction and an axial direction. A stopper ring 235 is provided in an opening side of the positioning concave portion 233. The peripheral flange 231 is prevented from coming off with respect to the positioning concave portion 233 by the stopper ring 235. A non-magnetic material ring 220 is provided in the engagement ring 219.

The electromagnet 153B is formed such that a coil winding number is gradually reduced toward an outer peripheral side. An end surface 237 of the electromagnet 153B, a wall portion 239 of the engagement ring 219, a wall portion 241 of the lock ring 143B, and a wall portion 243 of the receiving cover 73 are set in a tapered incline in correspondence to the coil winding number.

According to the present embodiment, the differential limiting mechanism 57B limits the differential rotation between the differential case 45B and the side gears 173B and 175B, and the differential lock mechanism 59B locks up the differential rotation between the differential case 45B and the axle shaft 5B.

Further, the limiting clutches 117Ba and 117Bb can be fastened to execute the differential limit of the differential mechanism 93B by controlling to excite the electromagnet 131B of the differential limiting mechanism 57B as well as the second embodiment.

When controlling to excite the differential lock mechanism 59B, a magnetic force loop 171B is formed over a yoke 155B, an engagement ring 219, and a lock ring 143B. Accordingly, the lock ring 143B slides through the inner spline 215 and the spline 217, and the dog clutch 145B is engaged. On the basis of the engagement, the relative rotation between the axle shaft 5B, the lock ring 143B, the engagement ring 219, and the differential case 45B is locked, and thereby the differential mechanism 93B is locked up.

In this case, the lubricating oil is supplied to the differential mechanism 93B via the openings 204 and 207 and the like, and the lubricating oil is supplied to the pilot clutch 119 via the opening 205 and the like. The lubricating oil is supplied to the differential lock mechanism 59B via the opening 206 and the like.

According to the present embodiment, it is possible to achieve approximately the same operations and effects as those of the second embodiment.

According to the present embodiment, since the limiting actor 63B of the differential limiting mechanism 57B is arranged between the differential case 45B and the bearing 49, and the differential lock mechanism 59B is arranged in the outer side in the axial direction of the bearings 47 with respect to the differential case 45B. Therefore, it is possible to inhibit the bearing span of the differential case 45B from being increased. As this result, it is possible to improve the supporting rigidity of the differential case 45B. Further, it is possible to improve a freedom for selecting the structure and the shape of the differential lock mechanism 59B. Namely, the differential lock mechanism 59B is arranged in the outer side in the axial direction of the bearings 47 with respect to the differential case 45B. Accordingly, and is released from the layout limit between the bearing 47 and the differential case 45B, it is possible to comparatively freely select the capacity, the property and the like of the mechanism.

Since the differential lock mechanism 59B is arranged within the receiving cover 73, it is possible to improve an assembling property of the differential lock mechanism 59B. In addition, it is possible to select with or without the additional layout in correspondence to the necessity of the differential lock mechanism 59B serving as the rear differential unit 1B, by appropriately setting the structure of the oil seal 213 serving as sectioning seal or the like and a connecting and supporting structure of the receiving cover 73. That is, the structure in which the differential limiting mechanism 57B is normally mounted, so that it is possible to largely improve a traveling stability of the vehicle. Further, it is possible to improve a productivity by additionally arranging the differential lock mechanism 59B in correspondence to a demand.

The receiving cover 73 is fixed to the side wall 74 of the differential carrier 3B, so that it is possible to easily attach the receiving cover 73.

Fourth Embodiment

FIGS. 6A to 6C are views according to a fourth embodiment of the present invention. FIG. 6A is a cross sectional view of a rear differential unit and a periphery thereof, FIG. 6B is an explanatory view showing an engagement of a limiting actuator with respect to a differential carrier, and FIG. 6C is an explanatory view showing an engagement of a lock actuator with respect to the differential carrier. The present embodiment corresponds to FIG. 2B as well as the third embodiment in FIG. 5. In the following explanation of the fourth embodiment, elements corresponding to those of the third embodiment are represented with like reference numerals or like reference numerals with C or like reference numerals with C in place of B.

According to the present embodiment, an formation of a differential lock mechanism 59C is modified. A differential limiting mechanism 57C in accordance with the present embodiment is not largely different from the differential limiting mechanism 57B in accordance with the third embodiment. In this case, as shown in FIGS. 6A and 6B, an engagement portion 137C is locked to a locking portion 139C, thereby a limiting actuator 63C is prevented from coming off.

The differential lock mechanism 59C is received within a receiving cover 73C as well as that of the third embodiment A lock mechanism portion 65C of the differential lock mechanism 59C is arranged in an inner peripheral side of a differential mechanism 93C. The lock mechanism portion 65C is provided with a lock block 245. The lock block 245 is arranged coaxially with a rotational axis of the differential mechanism 93C.

Namely, a concavo-convex engagement portion 249 is provided in a center side boss portion 247 of a pinion shaft 177C. The concavo-convex engagement portion 249 is engaged with a concavo-convex engagement portion 251 provided in an outer periphery of the lock block 245. The lock block 245 can move in a direction of a rotational axis on the basis of an engagement between the concavo-convex engagement portions 249 and 251.

A fitting concave portion 253 is provided in the side gear 175C side. The fitting concave portion 253 enables to fit an end portion of the lock block 245 thereto. A concavo-convex engagement portion 255 is provided in an inner peripheral surface of the fitting concave portion 253. The lock block 245 can be fitted into the fitting concave portion 253, and the concavo-convex engagement portion 251 can be engaged with the concavo-convex engagement portion 255.

A support hole 257 is provided in an axial center portion of the axle shaft 5C which movably supports a rod 259 transmitting an actuating force. Accordingly, the differential lock mechanism 59C is provided with the rod 259 transmitting the actuating force in an axial center portion of one output rotation member.

One end of the rod 259 is coupled to the lock block 245. A snap ring 246 is attached to one end of the rod 259 to prevent from coming off with respect to the lock block 245. A connecting pin 261 is coupled to the other end side of the rod 259. The connecting pin 261 is arranged in a hole 263 in a radial direction provided in the axle shaft 5C. A cross section of the hole 263 is formed in an elongate hole to allow a movement of the connecting pin 261 in parallel together with the movement of the rod 259. A connecting ring 264 is coupled to an outer end of the connecting pin 261. The connecting ring 264 is fitted to the axle shaft 5C, and is supported so as to be movable in an axial direction.

The lock actuator 67C has a solenoid 153C and a plunger 129C.

The solenoid 153C includes a yoke 155C and an electromagnetic coil 157C. The yoke 155C is fitted to the fitting concave portion 265 provided with the receiving cover 73C, and is brought into contact with a wall surface of the side wall 74 of the differential carrier 3C. An engagement portion 163C is attached to an outer periphery of the yoke 155C, as shown in FIGS. 6A and 6C, and the engagement portion 163C is engaged with a locking portion 165C. The locking portion 165C is structured by a concave portion provided in a wall surface of the side wall 74 of the differential carrier 3C. An end portion 267 of the yoke 155C forms a stopper of a plunger 129C.

The plunger 129C is what a magnetic material ring 266 and a non-magnetic material ring 159C are integrally formed in a ring shape. The plunger 129C can move in a direction of a rotational axis of the differential case 45C in correspondence to an electromagnetic force of the solenoid 153C. The non-magnetic material ring 159C is fitted and fixed to an outer peripheral surface of the connecting ring 264. A snap ring 269 is attached to the non-magnetic material ring 159C to prevent from coming off with respect to the connecting ring 264.

According to the present embodiment, the differential limiting mechanism 57C limits the differential rotation between the differential case 45C and the side gears 173C and 175C, and the differential lock mechanism 59C locks up the differential rotation between the differential case 45C and the side gear 175C via the lock block 245, the pinion shaft 177C, and the differential mechanism support ring 181.

If the solenoid 153C is controlled to be excited, a magnetic force loop 171C is formed. On the basis of the formation of the magnetic force loop 171C, the plunger 129C moves toward the end portion 267 side of the yoke 155C. On the basis of the movement of the plunger 129C, a moving force is transmitted to the rod 259 via the non-magnetic material ring 159C, the coupling ring 264, and the connecting pin 261. On the basis of the moving force, the rod 259 is moved in parallel within the support hole 257, and the lock block 245 is moved in the same direction in correspondence to the movement of the rod 259.

An end portion of the lock block 245 is fitted into the fitting concave portion 253 of the side gear 175C on the basis of the movement of the lock block 245. At this time, the concavo-convex engagement portion 251 of the lock block 245 is engaged with the concavo-convex engagement portion 255 of the side gear 175C. On the basis of the engagement, the relative rotation between the differential case 45C and the side gear 175C is locked via the differential mechanism support ring 181, the pinion shaft 177C, so that the lock block 245, and the differential rotation of the differential mechanism 93C is locked up.

According to the present embodiment, it is possible to achieve the same operations and effects as those of the third embodiment. In addition, since the differential lock mechanism 59C is provided with the rod 259 transmitting the actuating force in the axial center portion of the axle shaft 5C, it is possible to easily add the differential lock mechanism 59C without changing the differential case 45C and the bearings 47 and the like.

Fifth Embodiment

Figure 7:
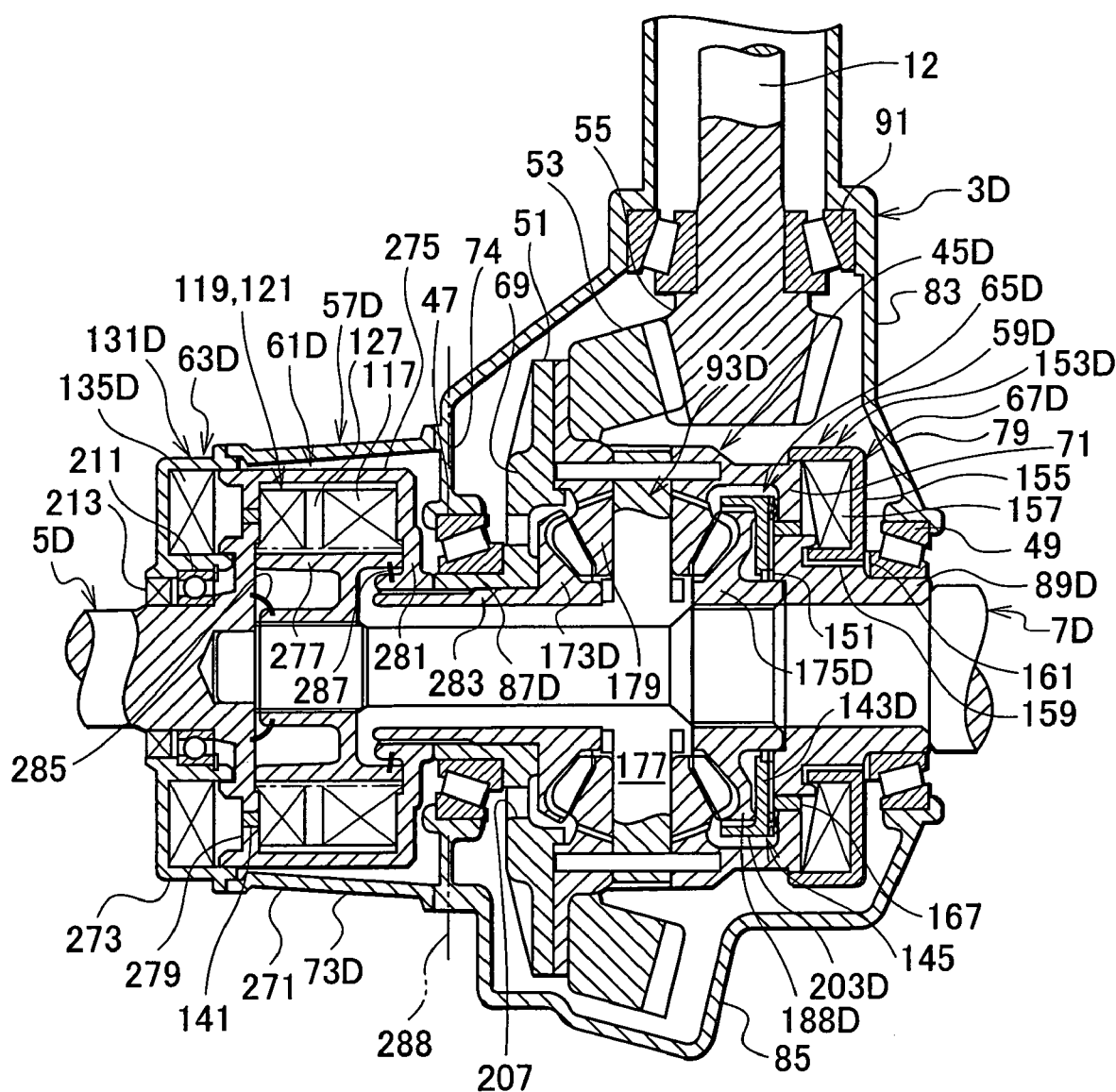
FIG. 7 is a cross sectional view showing a rear differential unit and a periphery thereof according to a fifth embodiment of the present invention.

FIG. 7 is a cross sectional view of a rear differential unit and a periphery thereof according to a fifth embodiment. The present embodiment corresponds to FIG. 2B as well as the third embodiment. In this case, a basic structure is the same as that of the third embodiment. In the following explanation of the fifth embodiment, elements corresponding to those of the third embodiment are represented with like reference numerals or like reference numerals with D or like reference numerals with D in place of B.

In the present embodiment, the differential limiting mechanism is arranged within the receiving cover, and the differential rotation between the axle shafts is directly limited.

A differential limiting mechanism 57D in accordance with the present embodiment is arranged within a receiving cover 73D. The receiving cover 73D includes a cylinderical portion 271 and a cap portion 273. The cylindrical portion 271 and the cap portion 273 are detachably coupled by bolt and nut or the like. The cylindrical portion 271 is detachably coupled to a side wall 74 of a differential carrier 3D side.

A limiting mechanism portion 61D in accordance with the present embodiment is structured such that a limiting clutch 117, a pilot clutch 119, a cam mechanism 121, a pressure plate 127 and the like are provided between a clutch housing 275 and a clutch hub 277.

The clutch housing 275 is united with or integrally formed with an axle shaft 5D. A non-magnetic material ring 141 is provided in one end wall 279 of the clutch housing 275. The other end wall 281 of the clutch housing 275 is splined to a boss portion 283 extended from a side gear 173D.

In a limiting actuator 63D in accordance with the present embodiment, the cap portion 273 of the receiving cover 73D is utilized as the yoke, so that an electromagnetic coil 135D is directly provided in the cap portion 273. Bearings 211 and an oil seal 213 are interposed between an inner peripheral of the cap portion 273 and the axle shaft 5D.

An inner peripheral of the clutch hub 277 is splined to an end portion of an axle shaft 7D extending through a rotational axial portion of a differential mechanism 93D.

Sectioning seals 285 and 287 are provided between the clutch hub 277 and the axle shaft 5D, and between the clutch hub 277 and the end wall 281 of the clutch housing 275, respectively. Accordingly, the limiting mechanism 61D can be isolated from a peripheral portion by the sectioning seals 285 and 287, to form a space having an independent lubrication cooling environment for the limiting mechanism 61D. Additionally, it is possible to form an inner side of the receiving cover 73D as an independent lubrication cooling space, by arranging the sectioning seal between the relative rotation portions in a line 288 corresponding to the side wall 74 of the differential carrier 3D.

In the differential lock mechanism 59D in accordance with the present embodiment, an annular protruding portion 203D of a lock ring 143D is splined to a clutch coupling portion 188D of a side gear 175D.

Accordingly, in the differential limiting mechanism 57D, when controlling to excite the electromagnet 131D, the control clutch 117 is fastened by the pilot clutch 119, the cam mechanism 121, and the pressure plate 127 as well as the third embodiment. On the basis of the fastening, the differential rotation between the left and right axle shafts 5D and 7D is directly limited via the clutch housing 275 and the clutch hub 277.

In the differential lock mechanism 59D, the lock ring 143D is moved against an energizing force of a spring 151 due to the exciting control of the electromagnet 153D, and thereby the dog clutch 145 is coupled.

Accordingly, the present embodiment can achieve approximately the same operations and effects as those of the third embodiment. In addition, the receiving cover 73D can be formed as a two-piece divided structure, so that it is possible to receive the differential limiting mechanism 57D in an unforced manner. Further, the cap portion 273 of the receiving cover 73D is utilized as the yoke, it is possible to reduce the number of the parts so as to simplify the structure. This enables to easily assemble and manage the parts.

Sixth Embodiment

FIG. 8 is a cross sectional view of a rear differential unit and a periphery thereof according to a sixth embodiment. The present embodiment corresponds to FIG. 2B as well as the fifth embodiment. In this case, a basic structure corresponds to FIG. 5. In the following explanation of the sixth embodiment, elements corresponding to those of the fifth embodiment are represented with like reference numerals or like reference numerals with E or like reference numerals with E in place of D.

According to the present embodiment, the differential limiting mechanism limits the differential rotation between the axle shaft and the differential case.

A limiting mechanism portion 61E of a differential limiting mechanism 57E includes the limiting clutch 117, the pilot clutch 119, the cam mechanism 121, the pressure plate 127 and the like between a clutch housing 275E and a clutch hub 277E as well as the fifth embodiment.

An end wall 281E of the clutch housing 275E is coupled to an outer periphery of a boss portion 87E of a differential case 45E with a spline connection or the like in an outer side of the bearings 47. A rotor 291 is screwed in an outer peripheral portion, to the other end portion of the clutch housing 275E. A lock nut 293 is fastened to an end portion of the rotor 291, in an end portion of the clutch housing 275E, and thereby the rotor 291 is prevented from coming off with respect to the clutch housing 275E A non-magnetic material ring 141E is provided in the rotor 291.

An electromagnet 131E of a limiting actuator 63E includes a yoke 133E and an electromagnetic coil 135E. The yoke 133E is fitted to a step portion 295 of an integrally formed receiving cover 73E so as to be centered. An end portion of the receiving cover 73E is fitted to a step portion 289 formed in a side wall 74 of a differential carrier 3E so as to be centered. The receiving cover 73E is fixed to the side wall 74 by a bolt or the like as well as mentioned above.

A lock mechanism portion 65E of a differential lock mechanism 59E has a dog clutch 145E provided between a side gear 175E and a lock ring 143E. Additionally, a spring 151E is provided between the side gear 175E and the lock ring 143E. The lock ring 143E is provided with a convex portion 297 at a predetermined interval in a peripheral direction. The convex portion 297 protrudes to an outer side of the differential case 45E from a through hole 299 of the differential case 45E. The through hole 299 is provided in the differential case 45E in correspondence to the convex portion 297 at a predetermined interval in a peripheral direction. An engagement plate 301 is fixed to the convex portion 297.

A lock actuator 67E has the same structure as that of the fourth embodiment in FIG. 6, and has a solenoid 153E and a plunger 129E. The solenoid 153E includes a yoke 155E and an electromagnetic coil 157E. The plunger 129E is structured by integrally forming a magnetic ring 266E and a non-magnetic material ring 159E, and faces to the engagement plate 301 in an axial direction.

The non-magnetic material ring 159E is fitted and attached to a slide ring 303. The slide ring 303 is fitted and fixed to a boss portion 89E of the differential case 45E. A spacer 305 is interposed between the slide ring 303 and the bearings 49.

A position switch 307 is attached to the differential carrier 3E. An engagement portion 309 of the position switch 307 is engaged with the engagement plate 301.

Accordingly, when the engagement plate 301 is moved in correspondence to the movement of the lock ring 143E, and the engagement plate 301 is engaged with the engagement portion 309 of the position switch 307 so as to actuate the position switch 307. As this result, it is possible to detect lock and unlock of the differential lock mechanism 59E.

A concave portion 311 extending along an axial direction is provided in an outer periphery, as shown in FIG. 8B, in the yoke 155E of the solenoid 153E. The concave portion 311 is engaged with an outer peripheral portion of the position switch 307. On the basis of the engagement, the solenoid 153E is engaged with the differential carrier 3E side via the position switch 307 in a rotational direction. Namely, the lock actuator 67E is supported to the differential carrier 3E side.

According to the sixth embodiment, in the differential limiting mechanism 57E, when controlling to excite the electromagnet 131E of the control actuator 63E, the limiting clutch 117 is fastened on the basis of the operation of the pilot clutch 119, the cam mechanism 121, and the pressure plate 127. According to the fastening, the relative rotation between the clutch housing 275E and the clutch hub 277E is limited, so that the differential rotation between the axle shaft 5E and the differential case 45E is limited. The differential limit of the differential mechanism 93E is executed on the basis of the limiting of the differential rotation.

In the differential lock mechanism 59E, when controlling to excite the solenoid 153E of the lock actuator 67E, the plunger 129E is moved. This movement is executed by the sliding motion of the non-magnetic material ring 159E with respect to the slide ring 303. The engagement plate 301 is received to a moving force according to the movement of the plunger 129E, and applies a pressure force to the convex portion 297 of the lock ring 143E. On the basis of the pressure force, the lock ring 143E is moved against an energizing force of the spring 151E, and the dog clutch 145E is coupled. In response to the coupling, the differential rotation between the side gear 175E and the differential case 45E is locked, so that the differential mechanism 93E is locked up.

According to the present embodiment, it is possible to achieve the same operations and effects as those of the embodiments mentioned above.

In this case, in the embodiments mentioned above, the explanation is given by setting the differential unit to the rear differential unit. However, a front differential unit 35 in FIG. 1 or a center differential unit by arranging the center differential unit in the transfer 19 may be employed as the differential unit.

One axle shaft or side gear may be employed as the input rotation member, and the other axle shaft side or the side gear and the differential case may be employed as the output rotation member.

The differential limiting mechanism or the differential lock mechanism may be structured such as to execute a differential limit between the side gears or between the hubs.

The differential limiting mechanism or the differential lock mechanism may be structured such that the limiting mechanism portion and the limiting actuator or the lock mechanism portion and the lock actuator are arranged between the differential case and the bearings rotatably supporting the differential case to the differential carrier.

The limiting mechanism portion or the lock mechanism portion may be arranged between the differential case and the bearings rotatably supporting the differential case to the differential carrier, and the limiting actuator or the lock actuator may be arranged out of the bearings.

A start actuation source such as an electric motor, a fluid cylinder and piston, a fluid pump, a viscous and magnetic fluid brake or the like may be employed as the limiting actuator or the lock actuator in addition to a structure using the electromagnet. In this case, it may include a converting mechanism for converting a vector of an actuating force of the actuation source, for example, a cam converting the rotational force in an axial direction, a gear converting the high speed rotation in the same rotational direction or the inverted rotational direction with the reduced speed, a link or a lever changing the stroke amount.

A support in the axial direction or the support in the radial direction, in addition to the engagement support in the rotational direction may be employed as the support of the limiting actuator or the lock actuator to the differential actuator.

The lubricating environment in the case of arranging both the differential limiting mechanism and the differential lock mechanism within the differential carrier may be designed by sectioning by an oil seal, a packing or the like so as to differentiate.

What is claimed is:

1. A differential unit comprising:
   a differential mechanism transmitting a rotational force from an input rotation member to a pair of output rotation members while allowing a differential rotation between the output rotation members;
   a differential limiting mechanism capable of limiting the differential rotation;
   a differential lock mechanism capable of locking up the differential rotation, the differential limiting mechanism and the differential lock mechanism being independently provided for independent operation;
   a differential carrier housing the differential mechanism and the differential limiting mechanism;
   an annular limiting actuator configured to actuate the differential limiting mechanism and disposed in the differential carrier together with the differential limiting mechanism;
   an annular lock actuator configured to actuate the differential lock mechanism, the annular lock actuator and the differential lock mechanism being disposed exterior of the differential carrier;
   a cover externally and detachably attached to the differential carrier, the cover defining an interior cavity housing the annular lock actuator and the differential lock mechanism; and
   the annular lock actuator being support by the cover.

2. The differential unit of claim 1, wherein:
   the differential mechanism is provided with an output coupling portion connected to one of the output rotation members, and the differential limiting mechanism and the differential lock mechanism limits or locks up the differential rotation between the input rotation member and the output rotation member or the output coupling portion.

3. The differential unit of claim 1, wherein:
   the differential mechanism is provided with output coupling portions connected to the output rotation members, the differential limiting mechanism limits the differential rotation between the pair of output rotation members or between the pair of output coupling portions, and the differential lock mechanism locks up the differential rotation between the input rotation member and one of the output rotation members or one of the output coupling portions.

4. The differential unit of claim 1, wherein the differential lock mechanism is provided with a rod transmitting an actuating force in an axial portion of one output rotation member.

5. The differential unit of claim 1, wherein the input rotation member is constituted by a different case receiving and supporting the differential mechanism, the differential case is rotatably supported to the differential carrier, and the differential case and the differential limiting mechanism are received and arranged within the differential carrier.

6. The differential unit of claim 1, wherein the input rotation member is constituted by a differential case receiving and supporting the differential mechanism, the differential case is rotatably supported by the differential carrier via first and second differential case supporting bearings, the differential limiting mechanism is arranged between the differential case and one of the first and second differential case supporting bearings, and the differential lock mechanism is arranged in an outer side in an axial direction of another of the first and second differential case supporting bearings with respect to the differential case.

7. The differential unit of claim 6, wherein the differential carrier is detachably provided with the cover on an outer side in an axial direction of the other of the first and second differential case supporting bearings.

8. The differential unit of claim 7, wherein the cover is fixed to a side wall of the differential carrier.

9. The differential unit of claim 1, wherein the input rotation member is constituted by a differential case receiving and supporting the differential mechanism, and the limiting actuator and the lock actuator are independently arranged at opposing sides of the differential case.

10. The differential unit of claim 9, wherein the differential case is rotatably supported to the differential carrier, and the limiting actuator and the lock actuator are supported to the differential carrier.

11. The differential unit of claim 9, wherein the differential case is rotatably supported to the differential carrier via bearings, and the limiting actuator and the lock actuator are independently arranged between the differential case and the bearings.

12. A differential unit comprising:
 a differential mechanism transmitting a rotational force from an input rotation member to a pair of output rotation members while allowing a differential rotation between the output rotation members;
 a differential limiting mechanism capable of limiting the differential rotation; and
 a differential lock mechanism capable of locking up the differential rotation, the differential limiting mechanism and the differential lock mechanism being independently provided for independent operation;
 the differential lock mechanism comprising;
  an engagement ring interlocked with the input rotation member;
  a lock ring interlocked with one of the output members, being movable in an axial direction and facing the engagement ring in the axial direction;
  a clutch provided between the engagement ring and the lock ring; and
  an actuator bringing the lock ring into engagement with the engagement ring;
 a carrier housing the input rotation member;
 the input rotation member having first and second boss portions provided on opposing sides for rotatably supporting the input rotation member in the carrier via bearings;
 an end the first boss portion being exposed to be accessible from an exterior of the carrier;
 the differential lock mechanism being disposed at the exterior of the carrier;
 an engagement portion provided between the engagement ring and the end of the first boss portion to detachably engage the engagement ring and the first boss portion; and
 a cover externally and detachably attached to a side wall of the carrier and defining a receiving cavity in conjunction with the side wall, the receiving cavity housing the differential lock mechanism.

13. A differential unit comprising:
 a differential mechanism transmitting a rotational force from an input rotation member to a pair of output rotation members while allowing a differential rotation between the output rotation members;
 a differential limiting mechanism capable of limiting the differential rotation; and
 a differential lock mechanism capable of locking up the differential rotation, the differential limiting mechanism and the differential lock mechanism being independently provided for independent operation;
 a carrier housing the input rotation member:
 the input rotation member having a rotation member portion exposed to an exterior of the carrier;
 the differential lock mechanism disposed at the exterior of the carrier;
 an engagement portion provided between the input rotation member and the differential lock mechanism to detachably engage the input rotation member and the differential lock mechanism; and
 a cover externally and detachably attached to a side wall of the carrier and defining a receiving cavity in conjunction with ihe side wall, the receiving cavity housing the differential lock mechanism.

* * * * *